United States Patent [19]

Saito et al.

[11] Patent Number: 4,724,188
[45] Date of Patent: Feb. 9, 1988

[54] MAGNETIC RECORDING MEDIUM

[75] Inventors: Masahiro Saito; Akira Nakabayashi, both of Osaka, Japan

[73] Assignee: C. Uyemura and Co., Osaka, Japan

[21] Appl. No.: 741,851

[22] Filed: Jun. 6, 1985

[30] Foreign Application Priority Data

Jun. 7, 1984 [JP] Japan ................ 59-116945

[51] Int. Cl.[4] ............................................. H01F 10/26
[52] U.S. Cl. .................................... 428/457; 420/457; 428/674; 428/680; 428/694; 428/900; 428/928; 427/127; 427/131; 427/132
[58] Field of Search ................ 420/457; 428/694, 900, 428/674, 680, 928, 457; 427/127, 131, 132

[56] References Cited

U.S. PATENT DOCUMENTS 3,832,168 8/1974 Gulla ................................... 420/457
4,397,812 8/1983 Mallory, Jr. ........................ 420/441

FOREIGN PATENT DOCUMENTS 51024 5/1981 Japan .
156931 12/1981 Japan .
18029 1/1982 Japan .
71524 5/1982 Japan .
71519 5/1982 Japan .
88806 5/1984 Japan .

Primary Examiner—George F. Lesmes
Assistant Examiner—William M. Atkinson
Attorney, Agent, or Firm—Birch, Stewart, Kolasch and Birch

[57] ABSTRACT

A magnetic medium in which the non-magnetic layer comprises nickel-copper-phosphorus film containing 20 to 65 wt % of copper, in which layer is formed by electroless plating. The non-magnetic layer does not become magnetic even after heat treatment at 200° C. or above.

14 Claims, 2 Drawing Figures

TEMPERATURE OF HEAT TREATMENT (°C)

MAGNETIC RECORDING MEDIUM

BACKGROUND OF THE INVENTION

1. Field of the Invention

The present invention relates to a magnetic recording medium such as a magnetic disc and a magnetic drum. More particularly, it relates to a magnetic medium in which the non-magnetic layer is a nickel-copper-phosphorus layer containing 20 to 65% by weight of copper, in which the layer is formed by electroless plating.

2. Description of the Prior Art

According to the conventional technology, magnetic recording media such as magnetic discs are produced by forming a non-magnetic layer on a non-magnetic substrate such as aluminum and then forming a magnetic layer thereon. The non-magnetic layer is usually a nickel-phosphorus (Ni-P) layer of comparatively high phosphorus content formed by electroless plating.

The Ni-P layer is deposited from an electroless nickel plating solution containing a hypophosphite as a reducing agent. It remains non-magnetic as long as it is kept at room temperature or is left as is after deposition; but it becomes magnetized when it is heated to more than about 200° C. This property causes a problem for the manufacture of the magnetic recording medium. Although heating of the non-magnetic Ni-P layer up to 200° C., especially 100° C. does not cause serious problems, the non-magnetic Ni-P layer is exposed to temperatures above 200° C. when the magnetic layer is being formed thereon by sputtering during the process of manufacturing the magnetic recording medium, which results in the magnetization of the non-magnetic Ni-P layer. The magnetization of the Ni-P layer adversely affects the performance of the magnetic recording medium.

A countermeasure worked out to solve this problem is to increase the content of phosphorus in the Ni-P layer up to 10% and above, so that the magnetization is minimized. However, this does not bring about a satisfactory solution because the reduction of magnetization by the increase of phosphorus content is a matter of relativity. The Ni-P layer of high phosphorus content still becomes magnetized. Moreover, it is difficult to deposit the Ni-P layer of high phosphorus content in the stable manner.

SUMMARY OF THE INVENTION

It is an object of this invention to provide an improved magnetic recording medium in which a non-magnetic layer remains non-magnetic even when exposed to high temperatures.

As the result of an extensive research on a non-magnetic layer which remains non-magnetic even after heat treatment at high temperatures, the present inventors have found that a nickel-copper-phosphorus (Ni-Cu-P) layer containing 20 to 65% by weight of copper formed by electroless plating does not become magnetic even after heat treatment at 400° C. for 1 hour, but retains the state it was in when it was deposited from the plating solution. It was also discovered that the electroless Ni-Cu-P deposition layer affords a high-performance magnetic recording medium when a magnetic layer is formed thereon. The present invention was based completely on these findings.

Hitherto, it is known that a Ni-Cu-P layer formed by electroless plating serves to reduce the formation of projections on the magnetic recording medium, as disclosed in Japanese Patent Laid-open No. 51024/1981. The Ni-Cu-P layer disclosed therein contains more than 65% by weight of copper (as in Example 1) or less than 1% by weight (as in Example 2). In the former case, the electroless plating proceeds poorly because of the excessively high copper content. In any event, neither of these two cases suggests the concept of the present invention. The present inventors discovered that a Ni-Cu-P non-magnetic layer containing 20 to 65% by weight of copper formed by electroless plating does not become magnetized even when said layer is heated to a temperature above 200° C., or even above 300° C., to form a magnetic layer thereon during sputtering. Thus it affords a magnetic recording medium of high performance.

Therefore, the present invention provides a magnetic recording medium comprising a non-magnetic substrate, a non-magnetic layer formed on the substrate, and a magnetic layer formed on the non-magnetic layer, characterized in that the non-magnetic layer is a nickel-copper-phosphorus layer containing 20 to 65 wt% of copper, the layer being formed by electroless plating.

According to the magnetic recording medium of this invention, the non-magnetic layer which consists of the electroless Ni-Cu-P deposit containing 20 to 65% by weight of copper, does not become magnetized but remains in a non-magnetic state even when it is heated. Thus the magnetic recording medium of the present invention exhibits good performance.

The above and other objects, features and advantages of the present invention will be more apparent from the following description.

DETAILED DESCRIPTION OF THE INVENTION

Figure 1:
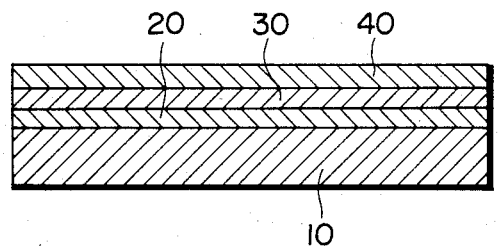
FIG. 1 is a sectional view of one embodiment of the magnetic recording medium according to this invention.

The magnetic recording medium of the present invention comprises, as shown in FIG. 1, a non-magnetic substrate 10, a non-magnetic layer 20 formed on the substrate 10, and a magnetic layer 30 formed on the non-magnetic layer 20. Optionally, a protective layer 40 may be formed on the magnetic layer 30.

According to this invention, the non-magnetic layer 20 consists of an electroless Ni-Cu-P deposit. The Ni-Cu-P layer formed by electroless plating should contains 20 to 65% by weight, preferably 30 to 55% by weight of copper. The non-magnetic layer that does not become magnetic when heated is obtained only when it contains copper as specified above. If the copper content is lower than 20% by weight, particularly lower than 10% by weight, the non-magnetic layer readily becomes magnetized, and therefore, the object of this invention cannot be achieved. On the other hand, if the copper content is higher than 65% by weight, the non-magnetic layer becomes readily oxidized and is so poor in adhesion and uniformity that it cannot be used for magnetic recording media. Incidentally, the non-magnetic layer may contain 4 to 10%, preferably 6 to 8% of phosphorus, with the remainder being nickel.

The Ni-Cu-P layer as mentioned above is obtained by electroless plating from an electroless plating solution containing a water-soluble nickel salt such as $NiSO_4.6H_2O$ and $NiCl_2.6H_2O$, a water-soluble copper salt such as $CuSo_4.5H_2O$ and $CuCl_2.2H_2O$, a hypophosphite such as $NaHPO_2.H_2O$, and a complexing agent. If necessary, the plating solution further contains a pH adjusting agent, a stabilizer, and other additives. The concentration of the water-soluble nickel salt may be 0.02 to 0.2 mol/liter; the concentration of the water-soluble copper salt may be 0.002 to 0.08 mol/liter; the molar ratio of nickel ion to copper ion may be 1/0.1 to 1/0.4, particularly 1/0.2 to 1/0.35; and the concentration of hypophosphite may be 0.1 to 0.5 mol/liter, if the resulting Ni-Cu-P layer is to contain 20 to 65% of copper and 4 to 10% of phosphorus.

Preferred examples of the complexing agent include (1) acetic acid, lactic acid, and other organic acids and their salts in which the coordinating atom is oxygen, (2) thioglycolic acid, cysteine and other compounds in which the coordinating atom is sulfur, and (3) ammonia, glycine, ethylene-diamine and other compounds in which the coordinating atom is nitrogen. The concentration (in mol) of the complexing agent may be equal to or higher than the concentration (in mol) of the total metal salts. The plating solution may have pH of 8 to 12, and the plating temperature may be 40° to 90° C.

In accordance with this invention, the thickness of the Ni-Cu-P layer may be properly selected; but usually it is 0.1 to 50 μm, preferably 10 to 30 μm.

In principle, the layer of ternary alloy (Ni-Cu-P) is formed by electroless plating from a plating solution containing these three elements. In actuality, however, it is difficult to produce said layer to be of uniform composition (across thickness) and desired composition, because the rate of deposition decreases and the concentration of the metal ions in the solution greatly fluctuates (particularly when the concentration of copper ions decreases) as the plating proceeds. To cope with this problem, it was necessary to replenish nickel ions, copper ions, and reducing agent which was consumed as the plating proceeded and to add a pH adjusting agent to compensate for the decreasing pH of the plating solution.

However, the present inventors discovered that the replenishment of copper ions caused problems. When copper ions are added during plating, the concentration of copper ions temporarily rises near the point of addition causing the The locally concentrated solution to instantaneously form a copper-rich surface on the substrate being plated, which results in the plating reaction being stopped because copper is very poor in catalytic activity. In contrast, the replenishment of nickel ions does not inhibit the process of plating because nickel has a high catalytic activity and the surface of metallic nickel has autocatalytic action.

The present invention further investigated the method for using the Ni-Cu-P plating solution continuously by replenishment. As the result, it was found that this can be achieved by replenishing a mixture of copper ion solution and nickel ion solution when copper ions are to be replenished. Copper deposits together with nickel on the substrate and even though the concentration of copper ions locally increases, the nickel which has been deposited helps smooth the plating on account of its autocatalytic action.

The above-mentioned finding suggests that it is preferable to replenish a solution comprising a mixture of copper ion and nickel ion even if the electroless Ni-Cu-P plating is to be performed continuously. It is further preferable to add a complexing agent to the mixture. Such would effectively prevent copper hydroxide from precipitating when the mixture is added. The amount of the complexing agent added is 1/20 mol to 1 mol for 1 mol of the total amount of nickel ions and copper ions. Where no complexing agent is added, the concentration of copper ions in the mixture should be lower than 20 g/liter to prevent the precipitation of copper hydroxide. If copper ions alone are added in high concentrations to the plating solution, copper hydroxide might precipitate, decomposing the plating solution.

The reducing agent and the pH adjusting agent may be added individually; but for stable, continuous use of the plating solution, it is preferable to mix them together prior to replenishment. The stabilizer may be added together with the reducing agent, the pH adjusting agent, or a mixture thereof.

The above-mentioned replenishers should be added according to the amount of each component which has been consumed or which is in short supply, after determining the concentration of each component in the plating solution. In practice, it is not necessary to determine the concentration of all the components. Since the consumption of the reducing agent and the decrease of the pH value are approximately proportional to the amount of metal ions consumed, the amount of the reducing agent and pH adjusting agent to be replenished can be determined according to the concentration of metal ions (nickel ions and copper ions) in the plating solution. The replenishment may be performed continuously or intermittently. The replenishment should be made before the consumption of nickel ions reaches 1 g/liter, preferably 0.5 g/liter, so that stable electroless plating is carried out with a minimum of fluctuation in depositing rate and layer composition.

The non-magnetic substrate on which the non-magnetic Ni-Cu-P layer by electroless deposition is formed can be any of the ones known. Examples of substrates include non-magnetic metals such as aluminum, aluminum alloys, copper, copper alloys (e.g., brass, phosphor bronze, etc.), titanium and the like, glasses, and plastics such as polyesters, polyamides, polycarbonates, ABS resin and the like. When the Ni-Cu-P layer is formed on the substrate, substrate may be pre-treated by the well-known methods depending on the type of the substrate. For example, an aluminum substrate may be subjected to the following pretreatment, i.e.

(1) cleaning with an organic solvent and then with an alkaline cleaner,
(2) etching with a sodium hydroxide solution,
(3) acid dipping,
(4) zinc immersion dipping, and
(5) copper strike plating.

To a glass substrate and a plastic substrate, the pretreatment such as chemical etching, sensitizing and activating process may be carried out before the Ni-Cu-P electroless plating.

After the completion of the Ni-Cu-P electroless plating, the Ni-Cu-P layer may preferably be subjected to lapping and/or polishing so that the surface of Ni-Cu-P layer becomes smooth and even.

On the Ni-Cu-P layer, the magnetic layer is formed by a well-known method. Examples of the magnetic layers are γ-$Fe_2O_3$ layer, a Co-Ni layer, a Co-Cr layer, a Co-P layer, a Co-Ni-P layer, etc. The layer may usually be formed by a vapor deposition method which includes a sputtering, electroless plating method, an electroplating method or a coating method, depending on the type of the magnetic layer to be formed. In this case, since the non-magnetic Ni-Cu-P layer contains 20 to 65% by weight of copper, it does not become magnetized even when heated to above 200° C. Due to this characteristic property, the Ni-Cu-P layer can be subjected to vapor deposition, such as sputtering which is carried out at temperatures of 200° C. or higher, or even higher than 300° C. in order to form magnetic layer, without any magnetization problems. Therefore, in the present invention, a vapor deposition method such as sputtering can be usefully employed for the formation of a magnetic layer, such as a γ-Fe$_2$O$_3$ layer, a Co-Ni layer, a Co-Cr layer or the like can effectively be formed as the magnetic layer by sputtering. The thickness of the magnetic layer is not limited, but is usually in the range of 100 Å to 1 μm.

The magnetic layer may preferably be covered with a protective layer. It can be any known layers such as inorganic layers which include SiO$_2$, carbon, Cr-C rodium, etc. and organic layers. In the formation of the protective layer, vapor deposition methods such as sputtering, which is carried out at temperatures of 200° C. or higher, can also be employed. Layers such as a SiO$_2$ layer, a carbon layer, a Cr-C layer or the like can effectively be formed by sputtering. The thickness of the protective layer is not limited, but is usually in the range of 0.05 to 0.5 μm.

As mentioned above, the magnetic recording medium of this invention comprises an electroless Ni-Cu-P deposition layer containing 20 to 65% by weight of copper. This layer does not become magnetized and remains non-magnetic even when it is heated. Thus the magnetic recording medium of this invention exhibits good performance.

The invention is now described in more detail with reference to the following examples.

EXAMPLE 1

A copper plate which had been pretreated in the usual way was dipped in an electroless plating solution of the following composition to form a 10 μm thick Ni-Cu-P layer thereon. The resulting layer was found to be composed of Ni 46%, Cu 49%, and P 5%.

| | |
|---|---|
| Nickel sulfate | 0.05 mol/liter |
| Copper sulfate | 0.02 mol/liter |
| Sodium hypophosphite | 0.3 mol/liter |
| Sodium citrate | 0.2 mol/liter |
| Borax | 0.05 mol/liter |
| Stabilizer | 1 ppm |
| pH | 10 |
| Bath temperature | 70° C. |

The resulting layer was subjected to heat treatment for 1 hour at different temperatures.

Figure 2:
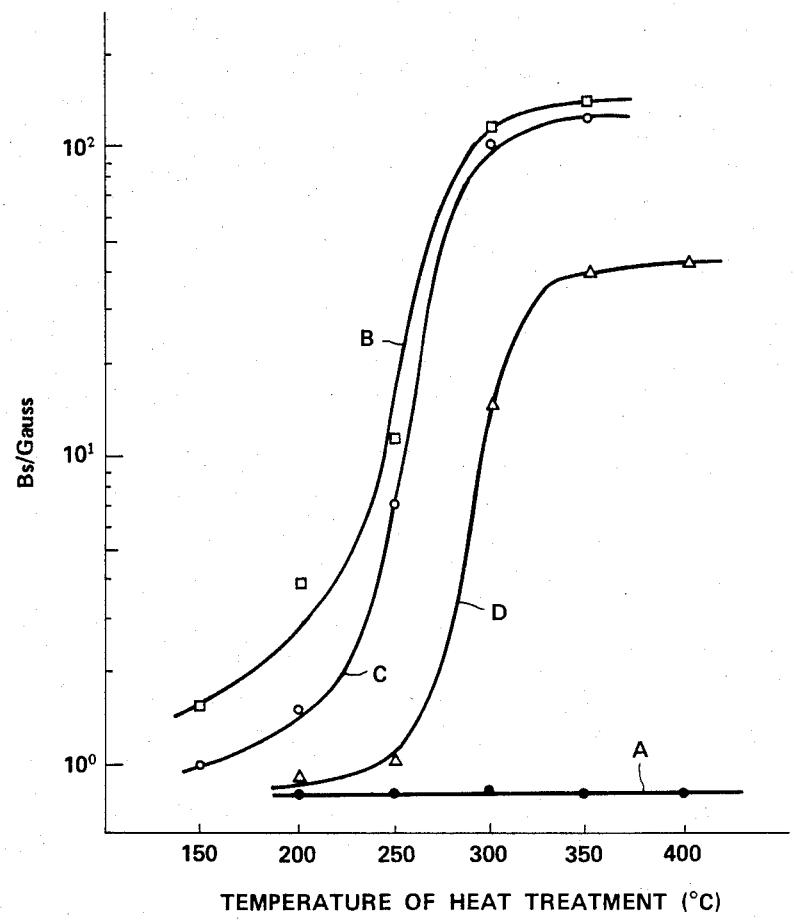
FIG. 2 is a graph showing the relationship between the heat treatment temperature and the magnetization of the Ni-Cu-P layer of this invention and the Ni-P layers of different phosphorus content.

For comparison, Ni-P layers each containing 8%, 9% and 13% of phosphorus were prepared by electroless plating, and they were subjected to heat treatment to investigate their magnetization in the same manner as above. The results are shown in FIG. 2 attached hereto. The curve A in the graph represents the Ni-Cu-P layer of this invention, and the curves B, C, and D represent the Ni-P layers each containing 8%, 9%, and 13% of phosphorus, respectively. The results indicate that the Ni-Cu-P layer according to this invention is not magnetized at all even after heat treatment at 400° C. for 1 hour.

In the meantime, where the Ni-Cu-P layer contains less than 20% of copper, it is magnetized by heat treatment at 300° C. The degree of magnetization was almost equal to the Ni-P layer containing 13% of phosphorus. The layer containing copper in excess of 65% is excessively oxidized by heat treatment, and therefore it cannot be used for the magnetic recording medium.

EXAMPLE 2

A copper plate measuring 1 dm$^2$ was continuously subjected to nickel-copper electroless plating with an initial plating solution and replenishing solutions each having the following compositions.

| | |
|---|---|
| Initial solution: | |
| Nickel sulfate | 0.1 mol/liter |
| Copper sulfate | 0.01 mol/liter |
| Sodium hypophosphite | 0.2 mol/liter |
| Sodium citrate | 0.2 mol/liter |
| Ethylenediamine | 0.05 mol/liter |
| Thiourea | 1 ppm |
| pH (adjusted with ammonia water) | 9.0 |
| Bath temperature | 80 ± 2° C. |
| Replenishing solution A: | |
| Nickel sulfate | 1.7 mol/liter |
| Sodium citrate | 0.2 mol/liter |
| (containing ca. 100 g of nickel ions in 1 liter) | |
| Replenishing solution B: | |
| Sodium sulfate | 0.8 mol/liter |
| Sodium citrate | 0.3 mol/liter |
| (containing ca. 50 g of copper ions in 1 liter) | |
| Replenishing solution C: | |
| Sodium hypophosphite | 5.0 mol/liter |
| Thiourea | 50 ppm |
| Replenishing solution D: | |
| Ammonia water | 1.0 mol/liter |
| Ethylenediamine | 0.2 mol/liter |

The volume of the plating solution was kept at 1 liter, and the replenishment was made as follows during the plating. The content of nickel and copper in the solution wad determined every 30 minutes, and 10 ml of replenishing solution A was added for 1 g of nickel ions which had been consumed and 10 ml of replenishing solution B was added for 0.05 g of copper ions which had been consumed. The replenishing solutions A and B were mixed prior to addition. The consumption of the reducing agent was compensated by adding the replenishing solution C. The concentration of each component in the replenishing solution C is so established that the initial level is recovered when 10 ml of the solution is added to fill up 1 g of both nickel and copper which have been consumed. The decreased pH of the solution is corrected by adding the replenishing solution D, which is prepared such that it can be added in the same amount as the replenishing solution C.

During the electroless plating with occasional replenishment as mentioned above, the rate of plating, the stability of the solution, and the composition of the layer were examined each time when the deposit reached a prescribed amount. The results are shown in Table 1.

For comparison, plating was continued without replenishment. The results are also shown in Table 1.

The Ni-Cu-P layer obtained in this example was not magnetized at all by heat treatment at 400° C. for 1 hour.

TABLE 1

| | Example Continuous operation | | | Comp. Example Batchwise |
| --- | --- | --- | --- | --- |
| | Immediately after make-up | After deposit of 150 μm · dm² | After deposit of 300 μm · dm² | After deposit of 30 μm · dm² |
| Rate of plating | 9 μm/hr | 9 μm/hr | 8 μm/hr | 2 μm/hr |
| Stability of bath | Stable | Stable | Stable | Unstable |
| Amount of Ni in layer | 45% | 44% | 45% | 80% |
| Amount of Cu in layer | 50% | 51% | 51% | 12% |
| Amount of P in layer | 5% | 5% | 4% | 8% |

What is claimed is:

1. An improved magnetic recording medium comprising a non-magnetic substrate, a non-magnetic layer formed on the non-magnetic substrate, and a magnetic layer formed on the non-magnetic layer, characterized in that the non-magnetic layer consists of a ternary nickel-copper-phosphorus alloy, said copper being present in an amount of from 30 to 55% by weight, said phosphorus being present in an amount of from 4 to 10% by weight and said nickel being present in a residue amount, said non-magnetic layer having been formed by electroless plating from an electroless plating solution containing nickel ion, copper ion and a hypophosphite.

2. The medium according to claim 1, wherein the phosphorus is present in an amount of from 6 to 8% by weight.

3. The medium according to claim 1, wherein a protective layer is formed on the magnetic layer.

4. The medium according to claim 1, wherein the protective layer is formed by a vapor deposition method.

5. The medium according to claim 1, in which said electroless plating is carried out at a temperature of from 40 to 90 C., said plating solution having a pH value of from 8 to 12.

6. The medium according to claim 1, wherein the magnetic layer is formed by a vapor deposition method which is carried out at a temperature of 200° C. or higher.

7. The medium according to claim 6, wherein the vapor deposition is sputtering.

8. A process for manufacturing an improved magnetic recording medium comprising:
    forming a non-magnetic layer on a non-magnetic substrate and forming a magnetic layer on the non-magnetic layer, said magnetic recording medium characterized in that the non-magnetic layer consists of a ternary nickel-copper-phosphorus alloy, said copper being present in an amount of from 30 to 55% by weight, said phosphorus being present in an amount of form 4 to 10% by weight and said nickel being present in a residue amount, wherein said non-magnetic layer is formed by electroless plating from an electroless plating solution containing nickel ion, copper ion and a hypophosphite.

9. The process according to claim 8, wherein the phosphorus is present in an amount of from 6 to 8% by weight.

10. The process according to claim 8, wherein said process is a continuous process, which further comprises replenishing of the nickel ion, the copper ion and the hypophosphite.

11. The process according to claim 8, wherein the magnetic layer is formed by a vapor deposition method which is carried out at a temperature of 200° C. or higher.

12. The process according to claim 11, wherein the vapor deposition is sputtering.

13. The process according to claim 8, which further comprises forming a protective layer on said magnetic layer.

14. The process according to claim 13, wherein the protective layer is formed by a vapor deposition method.

* * * * *